Patented May 21, 1940

2,201,648

UNITED STATES PATENT OFFICE 2,201,648

MONOAZO DYESTUFFS INSOLUBLE IN WATER

Ernst Fischer, Offenbach-on-the-Main, Germany, assignor to General Aniline & Film Corporation, a corporation of Delaware No Drawing. Application December 17, 1938, Serial No. 246,503. In Germany December 18, 1937

4 Claims. (Cl. 260—152)

The present invention relates to monoazo dyestuffs insoluble in water; more particularly, it relates to dyestuffs of the following general formula:

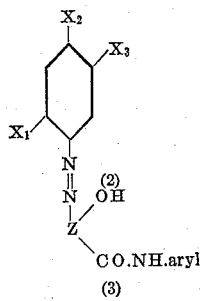

wherein $X_1$ means hydrogen, an alkyl-, alkoxy-, aralkoxy-, aryloxy-group or halogen; $X_2$ and $X_3$ mean hydrogen, an alkyl-, alkoxy-, aralkoxy-, aryloxy-group, halogen or the group

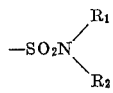

always one of the two substituents $X_2$ and $X_3$, not both simultaneously, being the group

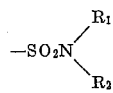

$R_1$ being an aliphatic radical containing more than 2 carbon atoms, an aralkyl or a hydroaromatic radical, $R_2$ being an alkyl, aralkl, aryl or a hydroaromatic radical, with the proviso that if $R_1$ and $R_2$ are simultaneously alkyl radicals, the sum of their carbon atoms must be at least 5, and these alkyl radicals may be connected in a heterocyclic ring system; and Z stands for a carbazole, diphenylene oxide or diphenylene sulfide radical.

I have found that valuable pigment dyestuffs may be obtained by coupling the diazo compound from an amine of the general formula

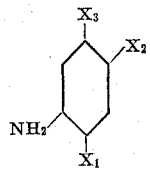

wherein $X_1$ means hydrogen, an alkyl-, alkoxy-, aralkoxy-, aryloxy-group or halogen; $X_2$ and $X_3$ mean hydrogen, an alkyl-, alkoxy-, aralkoxy-, aryloxy-group, halogen or the group

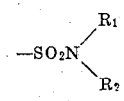

always one of the two substituents $X_2$ and $X_3$, not both simultaneously, being the group $$-SO_2N\begin{smallmatrix}R_1\\R_2\end{smallmatrix}$$

$R_1$ being an aliphatic radical containing more than 2 carbon atoms, an aralkyl or a hydroaromatic radical, $R_2$ being an alkyl, aralkyl, aryl or a hydroaromatic radical, with the proviso that if $R_1$ and $R_2$ are simultaneously alkyl radicals, the sum of their carbon atoms must be at least 5, and these alkyl radicals may be connected in a heterocyclic ring system, with an arylide of 2-hydroxycarbazole-3-carboxylic acid, 3-hydroxydiphenylene oxide-2-carboxylic acid or 3-hydroxydiphenylene sulfide-2-carboxylic acid, only such dyestuff components being used as do not contain any group lending solubility in water, such as the sulfonic or carboxylic acid group.

The new dyestuffs yield generally brown tints which, depending upon the kind of the diazo-compound used, extend to black-brown and have good properties of fastness. They are insoluble in water, but very easily soluble in many organic solvents, for instance, hydrocarbons, alcohols, esters, ketones and can be used for coloring these solvents as well as the lacquers prepared by means of these solvents such as nitro- or acetyl-cellulose lacquers, films or plastic masses. They are also very suitable for coloring varnishes, candles and fats. Owing to the different substituents present in the dyestuffs the suitability of the organic solvents named varies, but the most suitable solvents may easily be ascertained by experiment.

In comparison with the dyestuffs described in German Patents Nos. 551,880, 594,326 and 596,753, the dyestuffs obtainable by this invention are distinguished by their enhanced solubility in organic solvents so that they are very suitable for coloring bodies of the aforesaid kind, whereas the dyestuffs of the said patents have either no solubility in organic solvents or a solubility too small for these purposes.

The following examples serve to illustrate the invention, but they are not intended to limit it thereto:

(1) 32.8 grams of 1-amino-4-ethoxybenzene-5-sulfo-n-dibutylamide are diazotised in the usual manner. In order to bind the excess of mineral acid sodium acetate is added to the diazo-solution and the whole is stirred into a solution of 33.7 grams of 2-hydroxycarbazole-3-(carbonyl-1'-amino-4'-chlorobenzene) in dilute caustic soda solution. When the coupling is finished the dyestuff formed is filtered with suction, washed well and dried. It is a brown powder which dissolves easily in acetone, butyl alcohol and other organic solvents and colors cellulose ester lacquers vivid brown tints of good properties of fastness.

(2) 31.4 grams of 1-amino-2-methoxybenzene-5-sulfo-n-dibutylamide are diazotised in the usual manner. The diazo-solution is made neutral to Congo paper by means of sodium acetate. It is then introduced, while stirring, into a solution of 33.7 grams of 2-hydroxy-carbazole-3-(carbonyl-1'-amino-4'-chlorobenzene) in dilute caustic soda solution. The dyestuff formed is filtered with suction, washed well and dried. It dissolves easly in butyl acetate, xylene and other organic solvents and colors lacquers fast brown tints, which are somewhat more reddish than those obtainable with the product of Example 1.

(3) A pigment dyestuff is prepared as described in Examples 1 and 2 from the diazo-compound of 31.4 grams of 1-amino-2-methoxy-benzene-5-sulfo-n-dibutylamide and 36.3 grams of 3-hydroxydiphenylene oxide-2-(carbonyl-1'-amino-2'.5'-dimethoxybenzene). It dissolves easily in butyl acetate and xylene and colors cellulose ester lacquers dark brown tints of good fastness to light.

(4) By using in Example 2 instead of 31.4 grams of 1-amino-2-methoxybenzene-5-sulfo-n-dibutylamine 33.4 grams of 1-amino-2-methoxybenzene-5-sulfo-N(n)-butyl-anilide, a dyestuff of similarly good properties of fastness is obtained which colors the various organic solvents and the lacquers prepared therewith reddish brown tints.

(5) From the diazo-compound of 32.8 grams of 1-amino-4-ethoxybenzene-5-sulfo-di-isobutyl-amide and 31.9 grams of 3-hydroxydiphenylene sulfide-2-carbonyl-aminobenzene there is obtained, in the manner described in Examples 1 and 2, a brown pigment dyestuff which is easily soluble in organic solvents and colors cellulose ester lacquers very fast tints.

(6) The pigment dyestuff obtainable as described in Examples 1 and 2 from the diazo-compound of 29.8 grams of 1-amino-2-methyl-benzene-5-sulfo-di-isobutylamide and 33.7 grams of 2-hydroxycarbazole-3-(carbonyl-1'-amino-4'-chlorobenzene) is a brown powder, which dissolves easily in organic solvents, such as esters, alcohols and the like, and colors cellulose ester lacquers fast brown tints which are somewhat more yellowish than those obtainable with the product of Example 1.

The following table indicates a number of other mono-azo-dyestuffs obtainable by this invention, which are likewise easily soluble in organic solvents and have good properties of fastness:

| | Diazo-compound from— | Coupled with— | Shade |
|---|---|---|---|
| 1 | 1-amino-2-methoxybenzene-5-sulfo-piperidide | 2-hydroxycarbazole-3-(carbonyl-1'-amino-4'-chlorobenzene). | Reddish brown. |
| 2 | 1-amino-4-methoxybenzene-5-sulfo-n-dipropylamide | do | Do. |
| 3 | 1-amino-4-phenoxybenzene-5-sulfo-n-dibutylamide | do | Do. |
| 4 | 1-aminobenzene-4-sulfo-n-dibutylamide | do | Yellowish brown. |
| 5 | 1-amino-2-ethoxybenzene-5-sulfo-n-dibutylamide | do | Brown. |
| 6 | 1-amino-2.4-dimethoxybenzene-5-sulfo-n-dibutylamide | do | Do. |
| 7 | 1-amino-2-benzyloxybenzene-5-sulfo-n-dibutylamide | do | Do. |
| 8 | 1-amino-4-chlorobenzene-5-sulfo-n-dibutylamide | 2-hydroxycarbazole-3-(carbonyl-1'-amino-2'-methoxybenzene). | Yellowish brown. |
| 9 | 1-amino-4-chlorobenzene-5-sulfo-piperidide | do | Do. |
| 10 | 1-amino-2-methylbenzene-5-sulfo-N-methyl-iso-amylamide. | do | Do. |
| 11 | 1-amino-2:5-diethoxy-benzene-4-sulfo-n-dibutylamide | 3-hydroxydiphenylene oxide-2-(carbonyl-1'-amino-2'.5'-dimethoxy-benzene). | Dark brown. |
| 12 | 1-amino-4-ethoxybenzene-5-sulfo-n-dibutylamide | do | Yellowish brown. |
| 13 | 1-amino-2-ethoxybenzene-5-sulfo-di-isobutylamide | do | Dark brown. |
| 14 | 1-amino-2-methylbenzene-5-sulfo-di-isobutylamide | do | Yellowish brown. |
| 15 | 1-amino-2.5-dimethoxybenzene-4-sulfo-n-dibutylamide | do | Violetish brown. |
| 16 | 1-aminobenzene-4-sulfo-N-(n)-butylanilide | 2-hydroxycarbazole-3-(carbonyl-1'-amino-4'-chlorobenzene). | Yellowish brown. |
| 17 | 1-amino-2-methoxybenzene-5-(sulfo-N-ethyl-1'-amino-naphthalene). | do | Brown. |
| 18 | 1-amino-2-methylbenzene-5-(sulfo-N-(n)-butylbenzylamide). | do | Yellowish brown. |
| 19 | 1-amino-2-methoxybenzene-5-sulfo-dibenzylamide | do | Reddish brown. |
| 20 | 1-amino-2-methylbenzene-5-(sulfo-N-benzylcyclo-hexylamide). | do | Yellowish brown. |
| 21 | 1-amino-2-methoxybenzene-5-sulfo-N-benzylanilide | do | Reddish brown. |
| 22 | 1-amino-4-methylbenzene-5-sulfo-dicyclohexylamide | do | Yellowish brown. |
| 23 | 1-amino-3-methylbenzene-4-sulfo-n-dibutylamide | do | Do. |
| 24 | 1-amino-4-benzyloxybenzene-5-sulfo-n-dibutylamide | do | Brown. |
| 25 | 1-amino-3-chlorobenzene-4-sulfo-n-dibutylamide | do | Do. |
| 26 | 1-amino-2-methylbenzene-5-sulfo-N-methyl-(n)-butylamide. | do | Yellowish brown. |
| 27 | 1-amino-2-methoxybenzene-5-sulfo-N-ethyl-cyclohexylamide. | do | Brown. |
| 28 | 1-aminobenzene-3-sulfo-di-isobutylamide | do | Yellowish brown. |
| 29 | 1-amino-2-methylbenzene-5-sulfo-n-dibutylamide | do | Do. |
| 30 | 1-amino-2.5-dimethoxybenzene-4-sulfo-n-dibutylamide | do | Reddish brown. |
| 31 | 1-amino-2-phenoxybenzene-5-sulfo-n-dibutylamide | 2-hydroxycarbazole-3-(carbonyl-aminobenzene) | Brown. |
| 32 | 1-amino-2-methoxybenzene-5-sulfo-n-dibutylamide | do | Do. |
| 33 | 1-amino-2-chlorobenzene-5-sulfo-n-dibutylamide | do | Yellowish brown. |
| 34 | 1-amino-2-methoxybenzene-5-sulfo-n-dibutylamide | 3-hydroxydiphenylene oxide-2-(carbonylaminobenzene) | Brown. |
| 35 | 1-amino-4-ethoxybenzene-5-sulfo-n-dibutylamide | 3-hydroxydiphenylene oxide-2-(carbonyl-1'-amino-naphthalene). | Do. |
| 36 | 1-amino-2-methoxybenzene-5-sulfo-n-dibutylamide | 3-hydroxydiphenylene sulfide-2-(carbonyl-1'-amino-2'-ethoxybenzene). | Do. |
| 37 | do | 9-ethyl-2-hydroxycarbazole-3-(carbonyl-2'-aminonaphthalene). | Do. |
| 38 | do | 2-hydroxycarbazole-3-(carbonyl-1'-amino-2'-methyl-benzene-5'-sulfonyl-diethylamine). | Do. |
| 39 | 1-amino-4-ethoxybenzene-5-sulfo-n-dibutylamide | do | Do. |
| 40 | 1-amino-2-methoxybenzene-5-sulfo-n-dibutylamide | 2-hydroxycarbazole-3-(carbonyl-1'-amino-2'-methoxy-benzene-5'-sulfonyl-n-dibutylamine). | Do. |
| 41 | do | 2-hydroxycarbazole-3-(carbonyl-1'-aminobenzene-3'-carbonyl-diethylamine). | Do. |
| 42 | do | 3-hydroxydiphenylene oxide-2-(carbonyl-1'-amino-2'-methoxybenzene-5'-sulfonyl-diethylamine). | Do. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble monoazo dyestuffs of the following general formula:

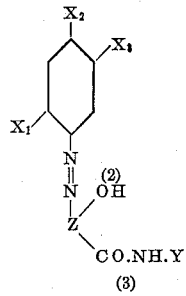

wherein $X_1$ stands for a member of the group consisting of hydrogen, alkyl, alkoxy, benzyloxy, phenoxy and halogen; $X_2$ and $X_3$ stand for members of the group consisting of hydrogen, alkyl, alkoxy, benzyloxy, phenoxy, halogen and the group

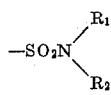

always one of the two substituents $X_2$ and $X_3$, not both simultaneously, being the group

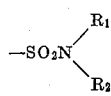

$R_1$ being a member of the group consisting of a aliphatic radical containing more than 2 carbon atoms, benzyl and a hydroaromatic radical, $R_2$ being a member of the group consisting of alkyl, benzyl, aryl and a hydroaromatic radical, with the proviso that if $R_1$ and $R_2$ are simultaneously alkyl radicals, the sum of their carbon atoms must be at least 5, and these alkyl radicals may be connected in a piperidine ring, Z stands for a radical of the group consisting of carbazole, diphenylene oxide and diphenylene sulfide, and Y stands for a member of the group consisting of radicals of the benzene and naphthalene series, being insoluble in water, but very easily soluble in organic solvents and yielding generally brown tints of good properties of fastness.

2. The water-insoluble monoazo dyestuff of the following formula:

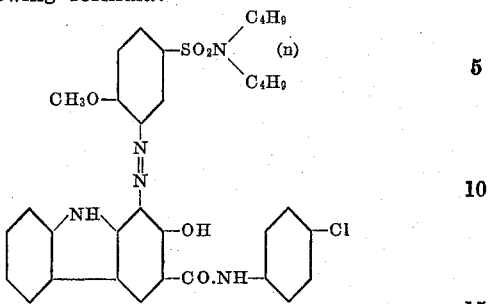

being insoluble in water, but very easily soluble in organic solvents and yielding reddish brown tints of good properties of fastness.

3. The water-insoluble monoazo dyestuff of the following formula:

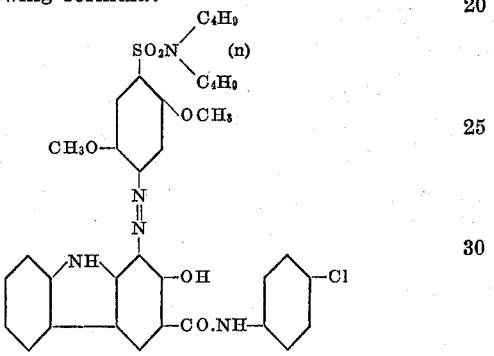

being insoluble in water, but very easily soluble in organic solvents and yielding reddish brown tints of good properties of fastness.

4. The water-insoluble monoazo dyestuff of the following formula:

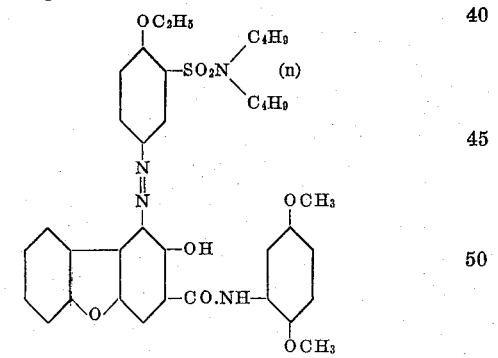

being insoluble in water, but very easily soluble in organic solvents and yielding reddish brown tints of good properties of fastness.

ERNST FISCHER.